United States Patent [19]

Meyerle

[11] Patent Number: 5,026,333
[45] Date of Patent: Jun. 25, 1991

[54] INFINITELY VARIABLE DRIVING AND STEERING TRANSMISSION MECHANISM FOR TRACK-LAYING VEHICLES

[76] Inventor: Michael Meyerle, Kiefernweg 9, D-7996 Meckenbeuren, Fed. Rep. of Germany

[21] Appl. No.: 584,499

[22] Filed: Sep. 18, 1990

Related U.S. Application Data

[63] Continuation of Ser. No. 477,146, Feb. 8, 1990, abandoned, which is a continuation of Ser. No. 273,820, filed as PCT DE87/00578 on Dec. 15, 1987, published as WO88/04253 on Jun. 16, 1988, abandoned.

[30] Foreign Application Priority Data

Dec. 5, 1986 [DE] Fed. Rep. of Germany ....... 3641648

[51] Int. Cl.$^5$ ............................................. F16H 47/08
[52] U.S. Cl. ........................................... 475/23; 475/24
[58] Field of Search ....................................... 475/23, 24

[56] References Cited

U.S. PATENT DOCUMENTS

| | | | |
|---|---|---|---|
| 3,383,952 | 5/1968 | Christenson | 74/720.5 |
| 3,398,605 | 8/1968 | Ainsworth et al. | 74/720.5 |
| 3,426,621 | 2/1969 | Mooney, Jr. et al. | 74/720.5 |
| 3,492,891 | 2/1970 | Livezey | 74/687 X |
| 3,545,303 | 12/1970 | Whelahan | 74/687 X |
| 3,575,066 | 4/1971 | Livezey et al. | 74/687 X |
| 3,583,256 | 6/1971 | Livezey | 74/720.5 |
| 3,596,535 | 8/1971 | Polak | 74/720.5 |
| 3,938,604 | 2/1976 | Kugler et al. | 180/6.44 |
| 3,966,005 | 6/1976 | Binger | 180/6.44 |
| 4,258,585 | 3/1981 | Orshansky, Jr. | 74/687 |
| 4,420,991 | 12/1983 | Meyerle | 74/682 |
| 4,485,691 | 12/1984 | Reed | 74/687 |
| 4,614,132 | 9/1986 | Hall, III | 74/720.5 |

FOREIGN PATENT DOCUMENTS

| | | | |
|---|---|---|---|
| 102049 | 9/1984 | European Pat. Off. | |
| 1965847 | 7/1971 | Fed. Rep. of Germany. | |
| 2521331 | 11/1976 | Fed. Rep. of Germany. | |
| 60-227045 | 11/1985 | Japan | 74/687 |
| 647168 | 2/1979 | U.S.S.R. | 180/6.44 |
| 2100373 | 12/1982 | United Kingdom | 180/6.7 |

*Primary Examiner*—Dirk Wright
*Attorney, Agent, or Firm*—Staas & Halsey

[57] ABSTRACT

An infinitely variable driving and steering gear for track-laying vehicles has a hydrostatic/mechanical overlaying steering gear. The mechanism includes a hydrostatic unit and a summation gear train for summing hydrostatic and mechanical input power. The summation gear train has one or more summed power outlet shafts. The drive mechanism also includes a first multiple shaft steering summation transmission that is operably coupled to the summed power outlet shafts and which has left and right steering output shafts. The drive mechanism also includes a second multiple shaft steering summation transmission having respective output shafts that are operably connected to first steering summation transmission. The shafts of the summation gear train of the driving transmission and the shafts of the first steering summation transmission are all coaxially arranged for rotation about a common axis.

10 Claims, 1 Drawing Sheet

INFINITELY VARIABLE DRIVING AND STEERING TRANSMISSION MECHANISM FOR TRACK-LAYING VEHICLES

This is a continuation of copending application Ser. No. 07/477,146 filed on Feb. 8, 1990 which is a continuation of Ser. No. 07/273,820 filed as PCT DE87/00578 on Dec. 15, 1987, published as WO88/04253 on Jun. 16, 1988, both now abandoned.

The invention relates to a drive mechanism for track-laying vehicles transmission with an infinitely variable driving and steering transmission mechanism.

Transmissions for track-laying vehicles with infinitely variable steering mechanisms are disclosed, for example, in European Patent No. EP 0 014 122 and in West German Patents Nos. DE 27 39 830 and DE 30 12 220. A transmission with an infinitely variable driving and steering mechanism is described in European Patent No. EP 0 004 427. These transmission systems, however, do not offer the advantage of compact, service- or vehicle-friendly construction. Also, modular construction cannot be achieved.

The invention has for its object the provision of an infinitely variable and, in particular, hydrostatic/mechanical mechanism with multiple power-transmission paths for track-laying vehicles which has an infinitely variable split-power gear train and which is compact and vehicle-friendly in its construction. The transmission mechanism of the invention facilitates modular construction and can easily be mounted and serviced.

The objects of the invention are achieved by the provision of a drive mechanism for a track-laying vehicle which comprises a hydrostatic/mechanical, infinitely variable branched driving transmission having a hydrostatic unit and a summation gear train for summing hydrostatic and mechanical input power. The summation gear train has one or more summed power outlet shafts. The drive mechanism includes a first multiple shaft steering summation transmission operably coupled to said summed power outlet shafts and having left and right steering output shafts. The drive mechanism also includes a second multiple shaft steering summation transmission having respective output shafts that are operably connected to the first steering summation transmission. In accordance with the invention, the shafts of the summation gear train of the driving transmission and the shafts of the first steering summation transmission are all coaxially arranged for rotation about a common axis.

In another aspect the invention provides a steering transmission for a track-laying vehicle having an infinitely variable driving system and which includes a hydrostatic transmission having a hydrostatic power outlet shaft. In this aspect of the invention, the steering transmission has a multiple shaft hydrostatic/mechanical summation planetary differential mechanism having at least two internal gears providing multiple shift ranges and an output shaft. The transmission also includes mechanical power input shaft means which includes a pair of oppositely rotating shafts, first clutch means for selectively drivingly connecting the hydrostatic power outlet shaft and the output shaft, and second clutch means for selectively and alternatively connecting the oppositely rotating shafts to one shaft of the differential mechanism. In this aspect of the invention the power outlet shaft is permanently drivingly connected to a second shaft of the differential mechanism.

In yet another aspect, the invention provides a drive mechanism for track-laying vehicles which comprises a hydrostatic/mechanical, infinitely variable branched driving transmission including a hydrostatic unit and a summation gear train for summing hydrostatic and mechanical input power. The summation gear train has one or more summed power outlet shafts. The mechanism also includes a first multiple shaft steering summation transmission that is operably coupled to the summed power outlet shafts and which has left and right steering output shafts. The drive mechanism further includes a second multiple shaft steering summation transmission having respective output shafts operably connected to the first steering summation transmission. In this aspect of the invention, the second steering summation transmission has first and second planetary gear stages. Each of the planetary gear stages includes a sun gear, a planet gear on a planet carrier and an internal gear. The planet carrier of one stage is connected to the internal gear of the other stage and the sun gears of the stages are coupled together.

DETAILED DESCRIPTION OF THE PREFERRED EMBODIMENTS OF THE INVENTION

Figure 1:
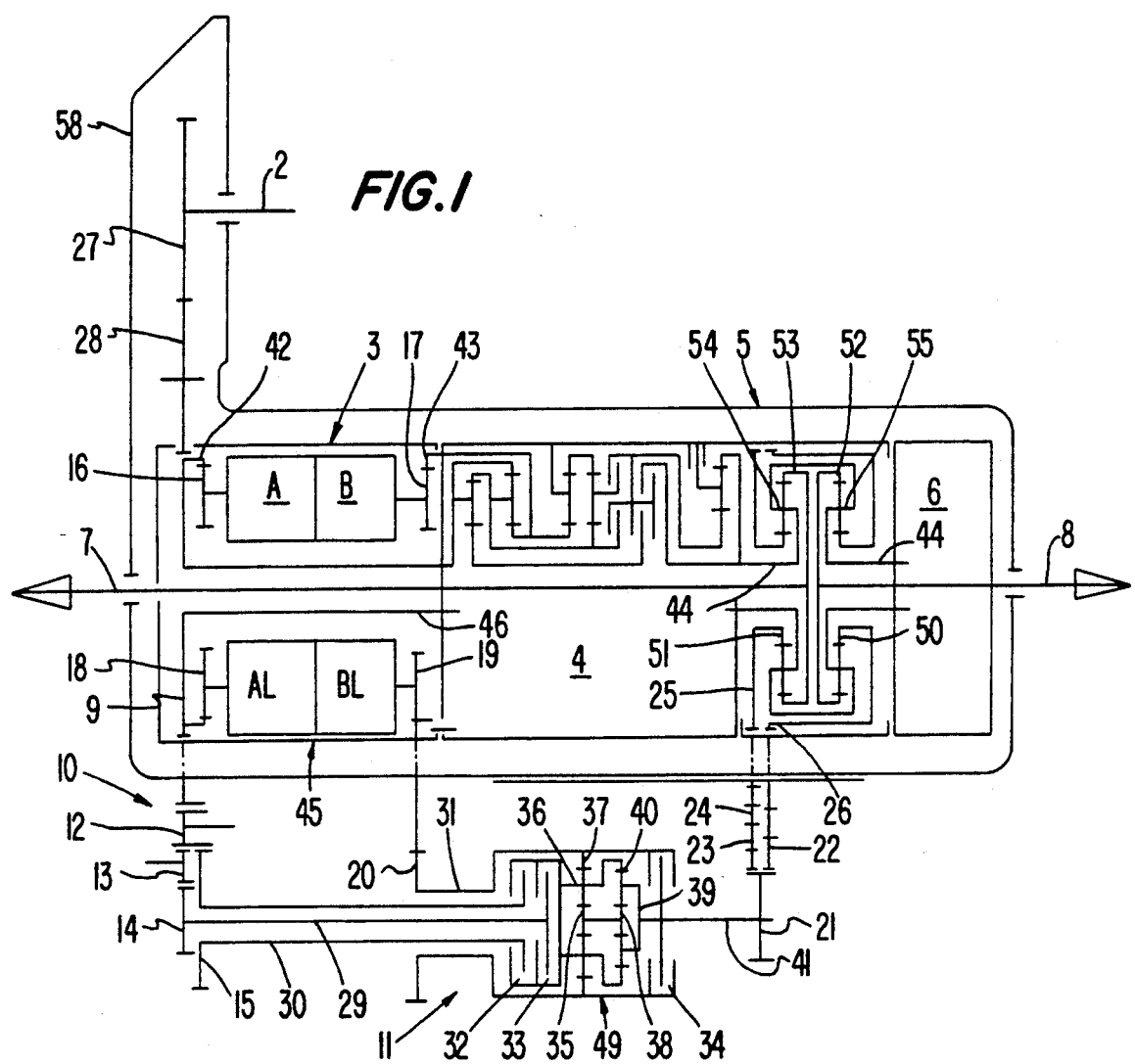
FIG. 1 is a schematic illustration of an infinitely variable driving and steering transmission mechanism for track-laying vehicles and which embodies the principles and concepts of the present invention.

The transmission illustrated in the drawings comprises essentially a hydrostatic/mechanical mechanism with a hydrostatic transmission 3 and a mechanical power-transmission path 4, a hydrostatic/mechanical split-power steering gear train 45, 10, 11, 5, and a brake system 6.

In order to achieve a service-friendly and compact construction, the hydrostatic transmission 3, the mechanical driving gear section 4 for the infinitely variable hydrostatic/mechanical driving mechanism the steering summation planetary gear train 5 and the brake system 6 are arranged as individual assemblages which are disposed in a series along the axis of output shafts 6 and 7. The steering gear section 11 (FIG. 1) or (FIG. 2) consists of a planetary internal differential 49 and steering range clutches 34 (FIG. 1) or 134 (FIG. 2), 32 and 33, as well as associated shafts 29, 30 and the neutral shaft 41, which are all offset laterally with respect to the central shaft 7, 8 and can be arranged as a separate assemblage 10.

The hydrostatic transmission 3 for the infinitely variable driving mechanism consists of a plurality of hydrostatic units A with adjustable volume and hydrostatic units B preferably with a constant volume, each arranged in a circumferential series around the axis of output central drive shaft 7.

Advantageously, the hydrostatic units A and B are arranged in side-by-side relationship in a circumferential extending series in a common case. The hydrostatic units A are driven by the input drive 2 by way of a central drive gear 9 and the two gears 16 and 42. At the same time, mechanical power is transmitted to gear mechanism 4 via the central driving gear 9 and the shaft 46. The hydraulic portion of the power is transmitted by hydrostatic units B via spur gears 17 onto a common gear wheel 43 of the mechanical driving gear section 4. Advantageously, the gear wheels 42 and 43, drivingly connected to the hydrostatic units A and B, are constructed as internal gears in order to reduce to a minimum the tangential or tooth-driving load on the associated spur gears 16 or 17. As shown in FIG. 1, the hydrostatic transmission 45 for the infinitely variable steering gear mechanism in the circumferentially extending space which accommodates the hydrostatic transmission 3. This results in the advantage that all of the hydrostatic units for both the drive input and for the steering input can be lodged in a single case and the entire oil supply and controls can be accommodated economically and simply. The hydrostatic transmission 45 for steering input consists of the hydrostatic unit AL with adjustable volume, and the hydrostatic unit BL preferably with a constant volume. Hydrostatic unit AL for the steering gear is driven via a spur gear 18, which is driven together with the spur gears 16 of hydrostatic units A of the drive transmission via input gears 27, 28, the central drive gear 9, and the spur gear or the internal gear 42. As previously noted, all the hydrostatic units A, B, AL, BL are arranged in a circumferentially extending series extending around central shaft. Preferably, the hydrostatic units A, B, AL, BL are constructed as axial piston units in order to achieve a high-power density for the entire hydrostatic assembly 3, especially for classes of high-power vehicles.

Figure 2:
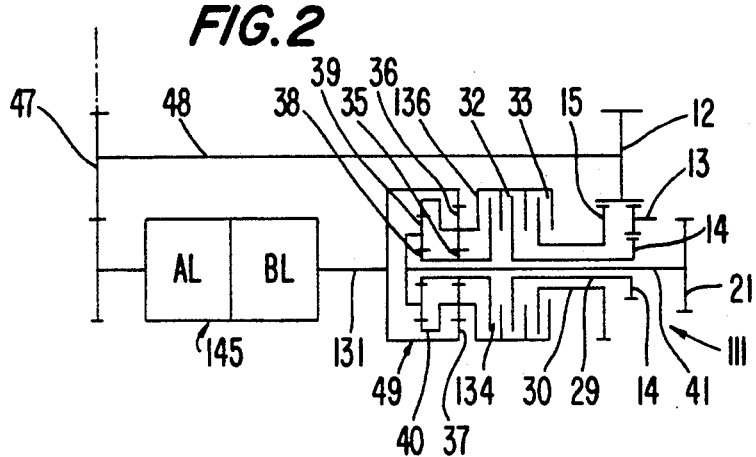
FIG. 2 is a schematic illustration of a portion of an infinitely variable driving and steering transmission mechanism and which depicts an alternative form of the mechanism of the invention.

As shown in FIG. 2, the hydrostatic transmission 145 for steering operation can also be arranged externally. This is especially useful if the entire steering gear, except for the steering summation gear train 5, is to be combined into a single assemblage and if the hydrostatic transmission 3, in order to achieve a higher power, fully takes up the circumferential space around shaft 7. According to this construction, the steering gear can be mounted in a common case as a single modular assemblage and can be placed outside of the main case 1.

The infinitely variable steering gear mechanism consists of the hydrostatic transmission 45 or 145 and the steering gear section 11 or 111, which cooperates with the steering summation gear train 5. The steering gear system has a first purely hydrostatic steering range acting in both steering directions and a hydrostatic/mechanical steering range assigned to each steering direction. The hydrostatic/mechanical steering range is joined continuously to the first purely hydrostatic steering range by shifting two clutches with synchronous operation of all the clutch elements. The steering gear section 11 or 111 features a planetary differential 49 consisting of two planetary gearing stages 35, 36, 37 and 38, 39, 40, a clutch 34 for the first steering range in both steering directions, a clutch 32, for example, for the second hydrostatic/mechanical steering range for steering to the right, and another clutch 33 for the hydrostatic/mechanical steering range for steering to the left.

OPERATING PRINCIPLE OF THE STEERING GEAR

For driving straight ahead, the hydrostatic gear 45 or 145 is set at zero displacement. The drive members; including the spur gear 19, spur gear 20 and shaft 31; (FIG. 1) and shaft 131 (FIG. 2) of the second hydrostatic 45 or 145 are motionless. In this condition, the clutch 34, 134 is also closed, as a result of which the neutral shaft 41 is also motionless. The clutches 32 and 33 for the particular second steering range for steering to the right or to the left are open. The spur gear stage 21, 22, 26 and the spur gear stage 21, 23, 24, 25 as well as the two sun gears 50, 51 of the steering summation gear train 5 are held at zero speed in this state, that is to say, when driving straight ahead. The two output drives 7 and 8 are now driven at the same speed by the fixedly connected internal gears 52 and 53 via the two planet carriers 54 and 55 through the output shaft 44 of the infinitely variable driving gear 4. When initiating a steering procedure, the hydrostat 45 or 145 is infinitely varied from zero, so that any desired output speed of the hydrostatic unit BL is transmitted via the spur gear stages 19, 20 to the clutch 34 and the neutral shaft 41, during which at the same, in a manner known in itself, via the two spur gear stages 21, 22, 26 and 21, 23, 24, 25, the two sun gears 51 and 50 of the steering summation gear train 5 are displaced in an appropriately high opposite direction of rotation. As a result, the speed of the internal gears 52 and 53 is varied in magnitude, thereby producing a corresponding steering action on the two output shafts 7 and 8. The final point of the first steering range is reached when the value of adjustment of the hydrostat 45 or 145 is at its maximum. This is followed by shifting to the second steering range with hydrostatic/mechanical power splitting by closing, for example, the clutch 33 with synchronous operation of the clutch members and simultaneous opening of the clutch 34 or 134. Mechanical power is now transmitted in the second steering range to the planetary differential 49 via the spur gear stages 12, 13 and 14 and the shaft 29, the clutch 33, the planet carrier 36 and added to the hydraulic power. In the second steering range, the hydrostat 45 or 145 is now reset and will also traverse to its other end position, where the final point of the second steering range is reached. The steering procedure to the other steering direction is identical, with the second steering range being shifted via the clutch 32 and the mechanical power being transmitted via the spur gear stages 12, 15 and the shaft 30.

Compared to steering gear systems of known construction, in particular as disclosed in West German Patent No. 30 12 220, the present steering gear system with the planetary gear differential 49, by virtue of the two planetary gear stages 35, 36, 37 and 38, 39, 40 has the advantage that a more favorable splitting of the range into a first range and a second range can be achieved, particularly with the object of obtaining good shifting quality when shifting the steering range and lower hydrostatic loads by reason of lower hydrostatic reactive power at the start of the second steering range. Moreover, a small, compact and vehicle-friendly construction is possible.

Furthermore, the neutral shaft 41 is connected not to a sun gear, but to a planetary gear section with a large diameter, namely, to a planet carrier. This has the advantage of smaller specific tooth-driving loads.

FIG. 2 shows a steering gear design in which the hydrostat 145 is disposed coaxially to the steering gear section 111. The steering gear system is identical to the design shown in FIG. 1. The connection of the second hydrostatic unit BL to the first range clutch 134 and the planet carrier 36 of the planetary gear differential 19 is not made via spur gear stages, but directly via a shaft 131. The neutral shaft 41 leads directly through the steering gear section 111 so that it can be coupled in simple fashion via the clutch 134 in the first steering range indirectly to the second hydrostatic unit BL of the hydrostatic transmission 145. The mechanical power in the second steering ranges is transmitted via the spur gear stages 9, 47, the shaft 48, and the spur gear stages 12, 13, 14 or 12, 15.

The advantage of this steering gear design lies in the fact that the entire steering gear assembly including the hydrostatic transmission 145 and steering gear section 111 can be combined into a single modular assemblage. A further advantage is that another hydrostat can be included in the hydrostatic transmission 3 for the steering drive, especially if a higher hydrostatic power for the driving mechanism is required.

The planetary gear differential 49 has a first planetary gear stage 35, 36, 37 and a second planetary gear stage 38, 39, 40, in which the planet carrier 36 of the first planetary gear stage is connected to a common clutch member of the two range clutches 32 and 33 for the hydrostatic/mechanical range and simultaneously to the internal gear 40 of the second planetary gear stage. The sun gear 35 of the first planetary gear stage is connected to the sun gear 38 of the second planetary gear stage. The internal gear 37 of the first planetary gear stage is drivingly connected to the second hydrostatic unit BL of the hydrostatic transmission 45 or 145 directly with a shaft 131 or indirectly via spur gears 19 and 20. In the design depicted in FIG. 1, the internal gear 37 can simultaneously be coupled with a clutch 34 to the neutral shaft 41. The planet carrier 39 of the second planetary gear stage is coupled directly to the neutral shaft 41. In the design of FIG. 2, the sun gears of the two planetary gear stages are connected to a clutch member of the first steering range clutch 134.

The steering gear design shown in FIG. 2 offers the advantage that the steering range clutches 134, 32 and 33 have a common clutch member 136 so that these clutches may be positioned next to each other to present a single modular assemblage.

In the FIG. 2 design, the sun gears 35 and 38 may be coupled to the planet carrier 36 or 136 via the clutch 134. Accordingly the coupling moment in the first hydrostatic/mechanical steering range is considerably smaller than in the design of FIG. 1, so that a correspondingly smaller and less expensive dimensioning of the clutches is possible.

The steering summation gear train 5 consists, in a manner known in itself, of two planetary gear stages 51, 54, 53 or 50, 55, 52. Depending on the requirements for the limiting gear ratios input to output, any known design of the steering summation gear train can be used. For example, it is possible to construct the two planetary gear stages with meshing planetary gears taking account of smaller output speeds in order to achieve a more favorable speed adaptation to any existing chain wheel transmissions.

Depending on the vehicle requirements, the brake system 6 may consist of a hydraulic brake and/or a mechanical brake as parking and emergency brake. Due to the special arrangement of the brake system 6 as the assembly at the far right hand end of the casing 1, the constituent wear parts of the brake can easily be accessed from outside the casing 1 for maintenance or replacement. In this case, the mechanical brake is advantageously disposed as outermost component.

The hydrostatic assembly 3 for the driving mechanism, mechanical gear section 4, the steering summation gear train 5 and brake system 6 are in the form of modular assemblages which may be mounted together and disposed one behind the other in alignment along the axis of shafts 7 and 8 in the order given. Each modular assemblage 3, 4, 5 may be in the form of an autonomous assembly unit. Because of this modular construction, the case 1 can be formed very easily, resulting in considerable savings of production cost and in economical manufacturing procedures. Because of the arrangement of the central input gears 9 at one end of the array of modular assemblages, especially in the case of a transmission design with a motor having its drive shaft disposed parallel to the output shafts, a very compact and vehicle-friendly construction of the entire drive assembly including both motor and transmission can be achieved. The drive occurs by means of transmission chain disposed in a flat case member, spur gears 27 and 28, and central gear 9. Preferably, the infinitely variable driving transmission 3, 4 is laid out such that the speed ratio goes to infinity, i.e., until the vehicle is not moving, so that a very expensive and space-requiring startup or disconnect clutch between motor and transmission that otherwise may be necessary can be dispensed with. The infinitely variable driving gear system described in West German Patent No. 36 22 045, and as shown in FIG. 1, is especially very suitable for this purpose.

If the motor and transmission are to be arranged in a T-shaped construction form with the motor placed at right angles relative to the output drives 7, 8, the input drive 2 may be interconnected with gear wheel 9 using a centrally located cone-pulley drive (not shown in the drawings).

The clutch 34 or 134 provided for the first steering range, which establishes a direct connection between the hydraulic power and the neutral shaft, can be replaced by a clutch which causes the planetary differential 49 to be blocked, e.g., by connecting internal gear 40 to planet carrier 39 via an appropriate clutch.

Instead of the planetary differential 49, the mechanism may include a three-shaft planetary gear train with engaging planetary gears on one planet carrier. Such gear train may include a respective internal gear locking into each planetary gear, an internal gear that is constantly in driving connection with the hydrostatic unit 45 and a planet carrier that is connected to at least two clutch members.

I claim:

1. A drive mechanism for a track-laying vehicle comprising:
    a hydrostatic/mechanical infinitely variable branched driving transmission including a hydrostatic unit and a summation gear train for summing hydrostatic and mechanical input power, said summation gear train having one or more summed power outlet shafts;
    a first multiple shaft steering summation transmission operably coupled to said summed power outlet shafts and having left and right steering output shafts; and
    a second multiple shaft steering summation transmission having respective output shafts operably connected to said first steering summation transmission,
    the shafts of said summation gear train of the driving transmission and the shafts of said first steering summation transmission all being coaxially arranged for rotation about a common axis.

2. A drive mechanism as set forth in claim 1 wherein is included a power input shaft, said driving transmission and said second steering transmission each having one or more shafts which are directly drivingly connected to said input shaft.

3. A drive mechanism as set forth in claim 1 wherein the shafts of said second summation transmission are arranged for rotation about a second axis which is parallel to and laterally spaced from said common axis.

4. A drive mechanism as set forth in claim 3 wherein is included a hydrostatic steering transmission having an outlet shaft that is operably coupled to said second summation transmission.

5. A drive mechanism as set forth in claim 4 wherein the outlet shaft of said hydrostatic steering transmission is coaxially arranged relative to the shafts of said second transmission for rotation about said second axis.

6. A steering transmission for a track-laying vehicle having an infinitely variable driving system, said steering transmission comprising:
   a hydrostatic transmission having a hydrostatic power outlet shaft;
   a multiple shaft hydrostatic/mechanical summation planetary differential mechanism having at least two internal gears providing multiple shift ranges, and an output shaft;
   mechanical power input shaft means including a pair of oppositely rotating shafts;
   first clutch means for selectively drivingly connecting said hydrostatic power outlet shaft and said output shaft; and
   second clutch means for selectively and alternatively connecting said oppositely rotating shafts to one shaft of said differential mechanism, said power outlet shaft being permanently drivingly connected to a second shaft of said differential mechanism.

7. A steering mechanism as set forth in claim 6 wherein said oppositely rotating shafts are arranged for coaxial rotation about a common axis.

8. A steering transmission as set forth in claim 6 wherein said first clutch means includes a clutch element operable to prevent relative movement between two shafts of said differential mechanism.

9. A steering transmission as set forth in claim 6 wherein said second clutch means includes at least two separate clutches having a common clutch member.

10. A drive mechanism for a track-laying vehicle comprising:
   a hydrostatic/mechanical, infinitely variable branched driving transmission including a hydrostatic unit and a summation gear train for summing hydrostatic and mechanical input power, said summation gear train having one or more summed power outlet shafts;
   a first multiple shaft steering summation transmission operably coupled to said summed power outlet shafts and having left and right steering output shafts; and
   a second multiple shaft steering summation transmission having respective outlet shafts operably connected to said first steering summation transmission, said second steering summation transmission having first and second planetary gear stages, each of which planetary gear stages includes a sun gear, a planet gear on a planet carrier, and an internal gear, the planet carrier of one stage being connected to the internal gear of the other stage and the sun gears of the stages being coupled together.

* * * * *

UNITED STATES PATENT AND TRADEMARK OFFICE
CERTIFICATE OF CORRECTION

PATENT NO. : 5,026,333
DATED : June 25, 1991
INVENTOR(S) : MICHAEL MEYERLE

It is certified that error appears in the above-identified patent and that said Letters Patent is hereby corrected as shown below:

Column 1, line 11, after "vehicles" delete "transmission".

Signed and Sealed this

Thirteenth Day of October, 1992

Attest:

DOUGLAS B. COMER

Attesting Officer    Acting Commissioner of Patents and Trademarks